Patented Mar. 5, 1946

2,396,191

UNITED STATES PATENT OFFICE 2,396,191

INSTRUMENT LUBRICANT

John D. Morgan, South Orange, and Russell E. Lowe, East Orange, N. J., assignors to Cities Service Oil Company, New York, N. Y., a corporation of Pennsylvania No Drawing. Application January 25, 1944, Serial No. 519,648

1 Claim. (Cl. 252—56)

This invention relates to instrument lubricants. More particularly the invention relates to a lubricant which is non-corrosive, non-oxidizable, and has a comparatively low and uniform viscosity over a wide temperature range.

For the lubrication of instruments such as clocks, chronometers, and the like, it is important that the lubricant shall be frictionless and shall be chemically stable. Such lubricants are subjected to many forms of atmospheric conditions such as moisture, air and changes of temperature. The lubricant must not oxidize or polymerize because these chemical changes generally change the lubricating value, viscosity and the physical properties of the lubricant. The lubricant must not be corrosive to the metal surfaces being lubricated. Also it is desirable that the lubricant shall not be a solvent for paints, varnishes, lacquers and the like with which the instrument parts are often coated.

The primary object of the present invention is to provide a lubricant which is stable, non-corrosive and which has a comparatively low and uniform viscosity over a wide temperature range.

Another object of the invention is to provide a lubricant which has a comparatively high flash point and is non-oxidizable.

A further object of the invention is to provide an instrument lubricant which is chemically stable and which will substantially overcome the objections discussed above.

We have discovered that an instrument lubricant which is stable and has an excellent viscosity for lubricating clocks may have the following composition:

| | Per cent by volume |
|---|---|
| Dibutyl phthalate | 50 |
| Tributyl phosphate | 40 |
| Acryloid HF860 | 10 |

This composition has a viscosity of 15.4 centistokes at 100° F. and 550 centistokes at —30° F. The flash point Cleveland open cup is 340° F. and the fire point Cleveland open cup is 365° F. When a bright tool steel is coated with this lubricant and exposed in the atmosphere for 100 hours the steel shows no indication of rusting.

Navy test panels 75E have been immersed in the above lubricant for 100 hours and showed no lifting of the paint layer below, at, or above the liquid line in the panel.

A sample of the above lubricant was placed in an electric oven maintained at 150° F. for 100 hours and showed an average loss of 2.89 percent.

A sample of the above lubricant was given an oxidation test in a Hoffman bomb under the Army and Navy Aeronautical Specification AN–G–10 and showed a pressure drop for the first 100 hours of 2 lbs., a pressure drop for the second 100 hours of 4.25 lbs. and a pressure drop for the third 100 hours of 5 lbs.

Acryloid HF860 is a composition consisting of a mixture of equal parts of the octyl and decyl esters of methacrylic acid, the polymerization being carried to the point of producing a product having a molecular weight of approximately 15,000.

The composition of the above described lubricant is quite critical as to the relative proportions of each component in obtaining the desired viscosity with a stable non-oxidizing, non-corrosive compound.

The preferred form of the invention having been thus described what is claimed as new is:

An instrument lubricant consisting of the following ingredients by volume, dibutyl phthalate 50%, tributyl phosphate 40%, a polymerized mixture of octyl and decyl esters of methacrylic acid 10%.

JOHN D. MORGAN.
RUSSELL E. LOWE.